R. C. DARROW.
Cider-Mill.
No. 216,314. Patented June 10, 1879.
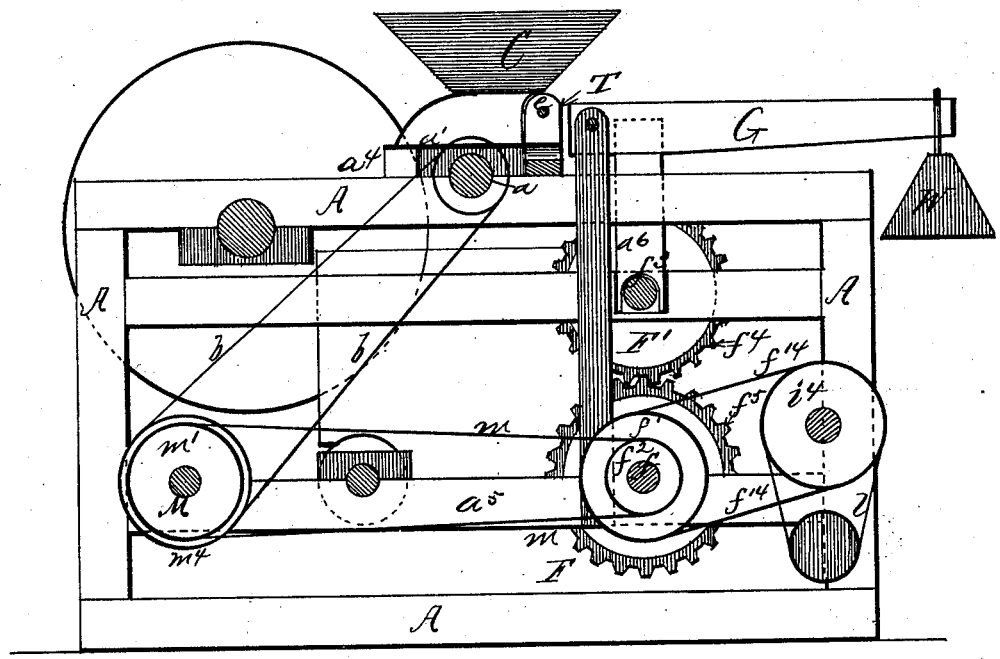
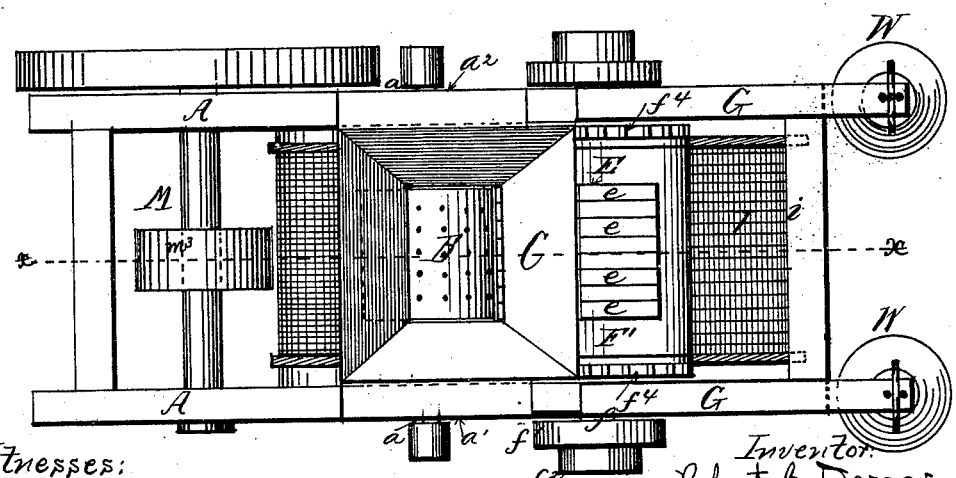

2 Sheets—Sheet 2.
R. C. DARROW.
Cider-Mill.
No. 216,314. Patented June 10, 1879.
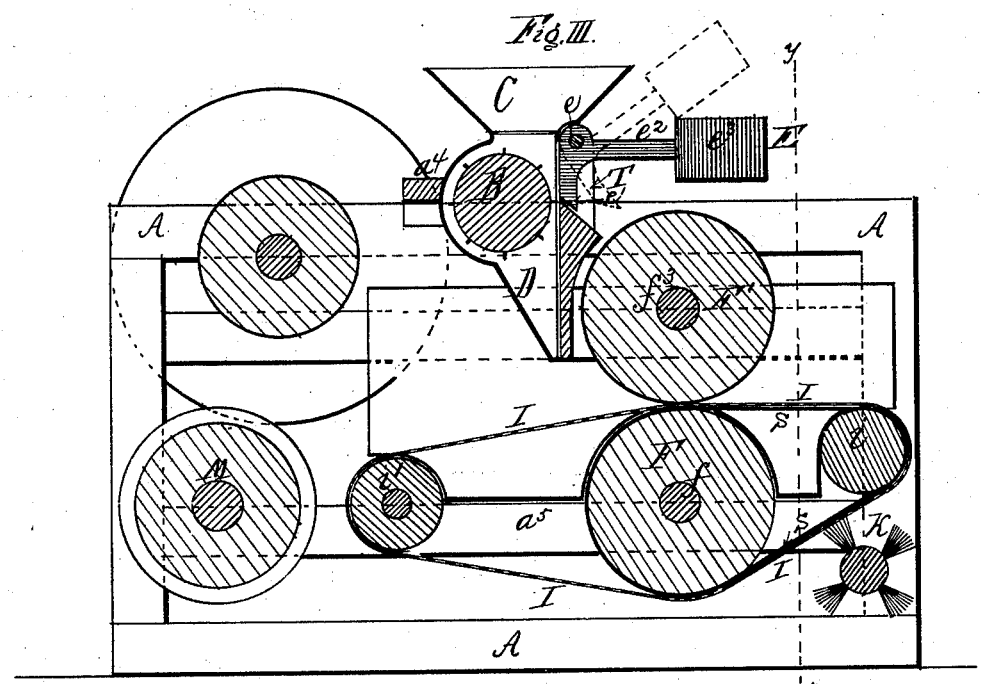
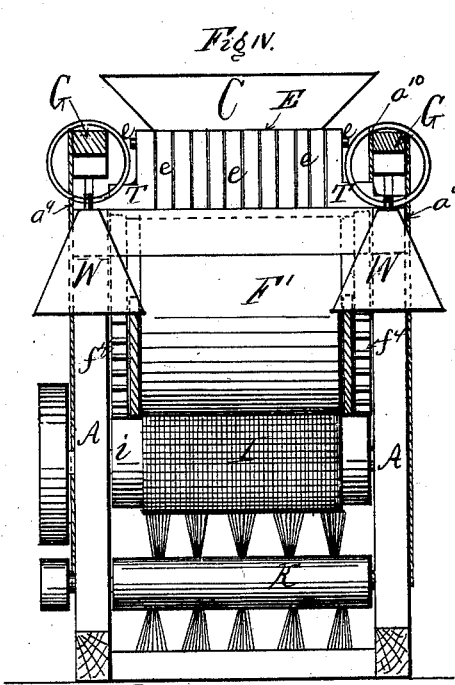
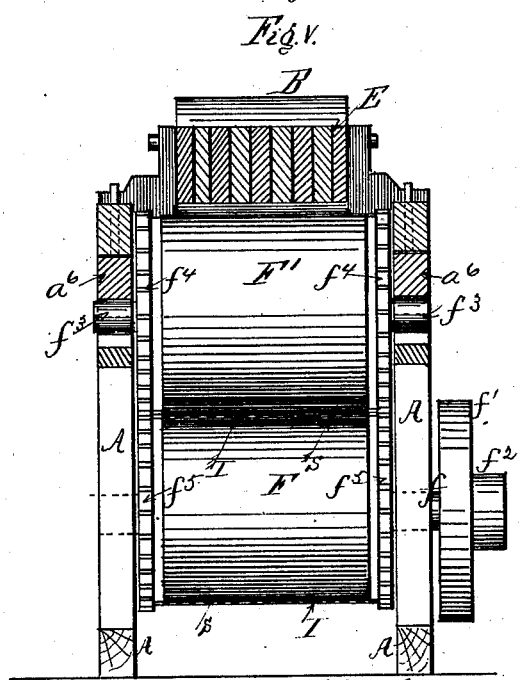
Witnesses:
O. Barritt
Ch. Reigleman
Inventor:
Robert C. Darrow,
Per: Richard Gerner
Atty.

UNITED STATES PATENT OFFICE.

ROBERT C. DARROW, OF ROSLYN, NEW YORK.

IMPROVEMENT IN CIDER-MILLS.

Specification forming part of Letters Patent No. 216,314, dated June 10, 1879; application filed November 1, 1878.

*To all whom it may concern:*

Be it known that I, ROBERT C. DARROW, of Roslyn, in the county of Queens and State of New York, have invented new and useful Improvements in Cider-Mills; and I do hereby declare that the following is a clear and exact description of my invention, reference being had to the accompanying drawings, forming a part of this specification.

The object of my invention is to provide for better and more satisfactory means than those at present known or used for extracting the juice of apples for the manufacturing of cider.

My invention consists in constructing a mill which will crush the apples and extract all the juice with expenditure of but little power in proportion to the work performed, and which is so constructed that it will not clog up nor be injured if a stone or any hard substance should happen to come into the hopper.

Referring to the drawings, Figure 1 is a side view of my improved cider-mill. Fig. 2 is a plan view. Fig. 3 is a sectional view on line $xx$, Fig. 2. Fig. 4 is an end view. Fig. 5 is a transverse sectional view taken on line $yy$, Fig. 3.

A is the frame of the machine, to the top of which, at $a$, is journaled, in bearings $a^1 a^2$, the grinding and mashing wheel or roller B. Over this roller is placed a hopper, C, supported by the cross-piece $a^4$. Underneath the roller B is fastened the chute D.

To the rear of the roller B are pivoted on the axle $e$, supported on the frame T, a number of relievers, E. These consist of a short vertical arm, $e^1$, and a long horizontal arm, $e^2$, the extreme outer end of which is formed into a weight, $e^3$, for the purpose of holding the reliever in the position shown in Fig. 2. The object of these relievers is to prevent any stone or hard substance from passing into the crusher B without necessitating stopping the running of the machine. Thus a stone or any other hard substance jamming itself between the roller B and the arm or arms $e^1$ will force the arm or arms outward, (see dotted line of Fig. 2,) and form an opening sufficiently large to allow the stone to drop out, and the weight $e^3$ will cause the arm $e^1$ to resume its natural position.

F F' are two rollers, placed one above the other, as shown in Fig. 1. The lower roller, F, is provided with an axle, $f$, which is journaled to the longitudinal support-pieces $a^5$.

To the outer ends of the axle $f$ is fastened the wheels or pulleys $f^1 f^2$ for belts, in order to impart motion to the roller F.

The upper roller, F', is also provided with an axle, $f^3$, which is journaled in the movable bearings $a^6$, which are acted upon by the lower arms, G G, fulcrumed to the standards $a^9$ and $a^{10}$, which are provided with weights W W at their outer ends, for the purpose of regulating the pressure of the roller F' upon roller F. Roller F communicates motion to roller F' by aid of the cogs or teeth $f^4 f^5$.

I is an endless carriage stretched over the rollers $i\ i'$, between the crushing-rollers F and F', and under and around the crusher or pressing roller F. This endless belt or carrier is, by preference, made of gauze, to allow the juice to flow through into a tank underneath the mill. (Not shown, as not forming any part of the same.)

Around the roller $i$ and the crusher-roller F, underneath the perforated belt I, is placed an endless band, $s$, of cloth, rubber, or any elastic material.

The object of this endless band is to allow the perforated belt I to give on the roller $i$ when too much pomace crowds itself between the crusher or pressing rollers F and F'.

K is a rotary brush, placed under roller $i$, the office of which is to brush the refuse off the perforated belt I. This brush receives its motion by a belt, $l$, from wheel $i^4$, which again receives its motion by belt $f^{14}$ from wheel $f^1$, which, in turn, receives its motion by belt $m$ from wheel $m^1$ on driving-shaft M, provided with pulleys $m^3$, receiving their motion from the driving-wheel of a steam-engine or any other power-machine.

The grinding-roller B receives its motion by belt $b$ from pulley $m^4$.

The operation is as follows: Apples are placed in the hopper C, where they are ground by the grinding-wheel B. The pomace thus ground drops down upon the endless perforated belt I, where it is carried between the crushing or pressing rollers F and F', and the juice extracted therefrom runs down through the perforated belt I into a tank below. The pomace after being pressed is carried further on the perforated belt, and it is brushed off at the end by the revolving brush K, which revolves in a contrary direction to that of the belt.

Having thus described my invention, I desire to claim—

1. The relievers E, in combination with the grinding-roller B and frame T, substantially as and for the purpose set forth.

2. The lever-arms G, with weights W W, in combination with the movable bearing $a^6$ and roller F', substantially as described, and for the purpose set forth.

3. The endless band S, in combination with the rollers $i$, and crushing or pressing roller F, and endless perforated carrier I, substantially as and for the purpose set forth.

ROBERT C. DARROW.

Witnesses:
 F. BARRITT,
 CH. RIEGELMAN.